United States Patent Office 3,089,581
Patented May 14, 1963

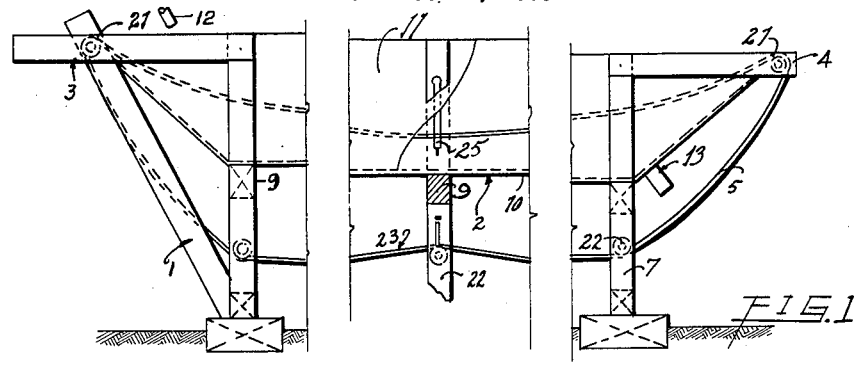
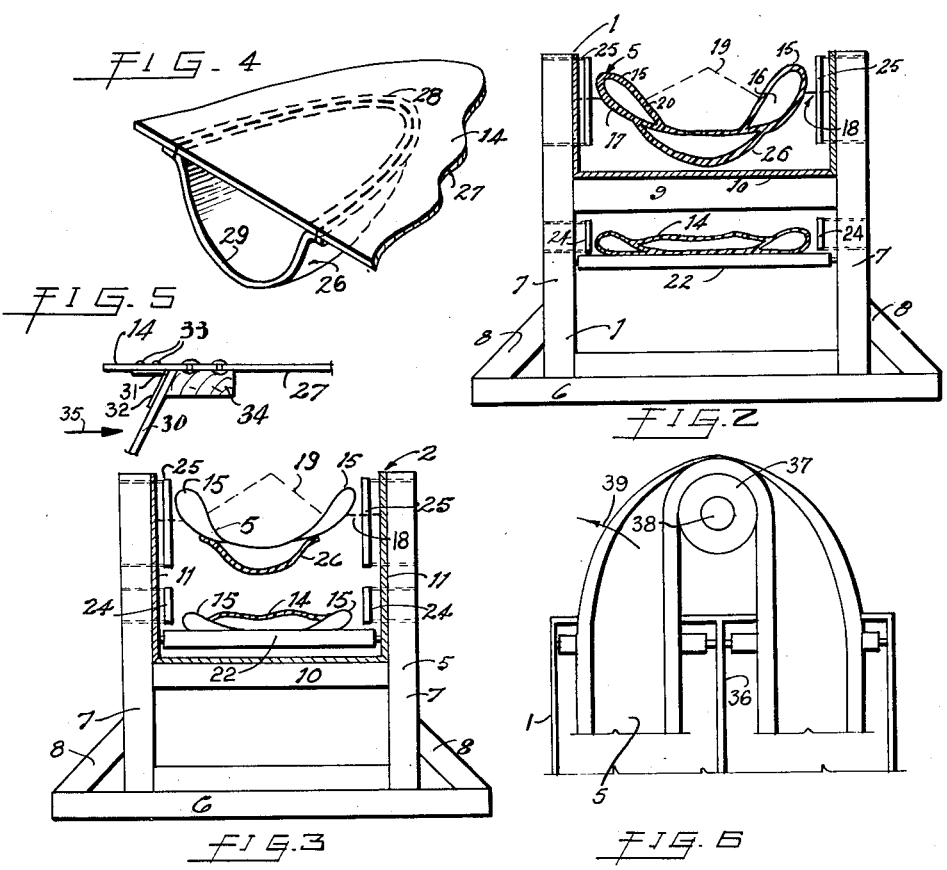
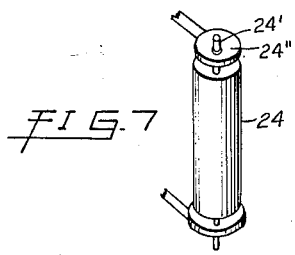

3,089,581
FLOATING CONVEYOR BELT
John Moar, 11632 Edinboro Road, Edmonton,
Alberta, Canada
Filed Dec. 7, 1959, Ser. No. 857,944
14 Claims. (Cl. 198—201)

My invention relates to new and useful improvements in the art of conveying materials and the like, and this application constitutes a continuation-in-part of my co-pending application Serial Number 620,555 filed on November 5, 1956, now Patent No. 2,998,122, the principal object and essence of my invention being to provide a conveyor belt which includes flotation means so that the upper run of the belt is supported upon a flotation medium.

A further object of my invention is to provide a device of the character herewithin described in which the conveyor belt can be of the endless variety or, alternatively, can be deflated and returned to the commencement of the conduit or trough after use for repeat transportation usage.

Another object of my invention is to provide a device of the character herewithin described in which the flotation medium can either be carried in a conduit or within a trough, canal or the like.

A yet further object of my invention is to provide a device of the character herewithin described in which the conveyor belt can be moved along the flotation medium by conventional means such as an external source of power or, alternatively, the flotation carrying conduit can be sloped so that the flotation medium flows by gravity carrying along the conveyor belt by skin friction.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 1 is a schematic side elevation of my system sectioned in part to show the interior thereof.

FIGURE 2 is a vertical section through FIGURE 1.

FIGURE 3 is a section similar to FIGURE 2, but showing an alternative embodiment.

FIGURE 4 is an enlarged fragmentary perspective view showing one of the pockets upon the floor of the conveyor.

FIGURE 5 is a fragmentary side elevation showing an alternative embodiment of FIGURE 4.

FIGURE 6 is a reduced plan schematic view of one end of the flume showing an alternative return method for the conveyor.

FIGURE 7 is an enlarged perspective view of one of the guide rollers per se.

In the drawings like characters of reference indicate corresponding parts in the different figures.

Relatively long conveyor belts suffer from the principal disadvantage that they have to be supported constantly along their lengths by means of pulleys, rollers and the like which, if the conveyor belt is passing over rough terrain, necessitates considerable superstructure to carry these rollers and pulleys. Furthermore, when using a conveyor belt of this nature over a relatively long distance, and particularly when it is used for conveying loose material such as gravel, rock and the like, enclosing sides are required to maintain the gravel, rock or other material within the confines of the conveyor belt.

I overcome these disadvantages by providing a conveyor belt which in its formation forms a trough for receiving the material and which furthermore does not need intermediate rollers or pulleys to support same inasmuch as it is adapted to float upon the surface of a flotation medium such as water or the like.

Proceeding now to describe my invention in detail, reference should be made the the accompanying drawings which shows a side elevation of the system in schematic form.

It consists primarily of framework collectively designated 1 carrying a flume collectively designated 2, said flume being on an inclined plane and having its higher end 3 at the left-hand of the drawing and its lower end 4 at the right-hand thereof. Also associated with the flume is a load carrying flotation conveyor assembly collectively designated 5.

In detail, the framework consists of transverse base members 6 and spaced pairs of vertical supporting members 7 extending upwardly therefrom and benig braced by means of diagonals 8. Further transverse members 9 span the vertical supports 7 at intervals and act as supports for the flume collectively designated 2, the details of which will now be described.

The flume 2 consists of a floor or base 10 and a pair of vertical sides 11 extending upwardly therefrom and it should be understood that the flume 2 inclines downwardly from the loading end 3 towards the discharge end 4.

In the drawing an inlet pipe 12 has been illustrated adapted to discharge water continuously into the flume and adjacent the end 4 an exit pipe 13 permits the water to flow from the flume thus providing a continuous flow of water through the flume at all times during operation.

However, it will be appreciated that this drawing is schematic and under normal circumstances it is contemplated that a convenient stream would be diverted into the flume to supply the continuous volume of water required.

The load carrying flotation carrier assembly 5 consists of a flexible floor 14 preferably made from rubberized canvas or the like, said floor having elongated flotation chambers 15 formed upon both sides thereof and it will be observed that this load carrying flotation carrier assembly is in the form of an endless belt. The flotation chambers 15 are either filled with air or other flotation gas as indicated at 16 or, alternatively, may be filled with foam rubber or plastic or other flotation medium such as kapok as illustrated at 17. The flexibility of the carrier permits it to travel around curves in the flume provided guiding side rollers are supplied.

When the conveyor is floating within the liquid in the flume (the level of which is indicated at 18) the load of ore or gravel or other material is carried by the floor 14 of the conveyor and is illustrated by the broken lines 19 in FIGURES 2 and 3, and it will be appreciated that if gravel or ore is being carried then it can be loaded at the end 3 by means of a conventional conveyor as a continuous process.

The upper run 20 of the load carrying flotation conveyor assembly floats on the liquid in the flume as hereinbefore described and the under-run returns either underneath the flume as illustrated in FIGURES 1 or 2, within the flume and below water as illustrated in FIGURE 3, or alongside on the surface as shown in FIGURE 6. If returned as per FIGURE 3, the air or gas will have to be exhausted by rollers (not shown) prior to returning under water.

Horizontally disposed rollers 21 are situated at both ends of the flume and, in FIGURES 1 and 2, further horizontal rollers 22 are journalled for rotation between the vertical members 7 of the framework and support the lower run 23 on its return journey. Also, it will be observed that vertically situated side rollers 24 are provided at intervals in conjunction with the horizontal rollers 22 and these vertical side rollers maintain the lower run 23 separately below the flume.

It will be also observed that I have provided vertically situated rollers 25 at spaced intervals along the flume sides 11 and these vertically situated rollers maintain the load carrying portion of the conveyor centrally within the flume and prevent frictional interference thereof. The rollers 24 and 25 are journalled for rotation on spindles 24' between plates 24" secured to the framework 1 by means of bolts extending therefrom as shown.

Means are provided to utilize the effect of the current of the water flowing within the flume, to urge the flotation conveyor assembly along the flume. In the embodiment shown in FIGURES 2, 3 and 4, I have provided flexible cups 26 secured to the underside 27 of the floor 14 of the flotation conveyor assembly.

Reference to FIGURE 4 will show that these cups 26, which are flexible, are closed at the forward end 28 thereof and open at the rear end 29 thereof so that the moving water fills the cups and this carries the conveyor along the flume. These cups are emptied of the water therein as they pass over the roller 21 at the lower end 4 of the flume, it being understood that they collapse due to their flexibility. They remain collapsed until opened by the current when they re-enter the flume at the upper end 3. If they are used in the embodiment shown in FIGURE 2, then the closed ends of the cups meet the current and thus they remain closed and do not offer any resistance to their passage back through the flume.

FIGURE 5 shows an alternative method of carrying the conveyor along the flume, which consists of a rigid paddle 30 hinged at the upper end thereof as at 31 to a flexible strip 32 which in turn is secured to the underside 27 of the floor 14 of the conveyor by means of staples 33 or other similar means. A block 34 is secured to the strip 32 and prevents the paddle from moving any further in the direction of arrow 35, which arrow indicates the direction of the movement of the current.

It will be appreciated that when the carrier is moving in the opposite direction to arrow 35, the paddle will hinge upwardly to lie against the under side 27 of the floor 14 thereof.

In operation the load of ore, gravel or similar material may be dumped continuously on the conveyor at the upper end 3 and is discharged over the roller 21 at the end 4 to be handled as desired. If necessary, it can be dumped on a further flume for further conveyance.

Although the device is intended primarily for comminuted materials, it will be appreciated that it can also be used for the conveyance of bales and the like loaded manually or mechanically provided that the load at any one time does not exceed the buoyancy characteristics of the load carrying conveyor belt.

Finally, reference should be made to FIGURE 6, which shows the frame 1 in plan view and includes a divider strip 36 centrally placed along the length thereof. In this embodiment, the load carrying conveyor 5 travels along the left-hand side of the flume with relation to FIGURE 6, either the aforementioned paddles 30 or the pockets 26 being secured to the underside thereof. At the end of the flume, the conveyor is routed around a vertically situated roller 37 journalled upon spindle 38 thus causing the load to be dumped from the conveyor in the direction of arrow 39. Once the conveyor has passed around the roller 37, it regains its horizontal position and returns along the flume on the opposite side of the partition 36 (namely on the right-hand side with reference to FIGURE 6).

In this case the pockets or paddles, of course, will be travelling against the current and will be collapsed as hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A floating conveyor belt system comprising in combination an inclined flume assembly through which a liquid, such as water, runs continuously, an endless flexible load carrying element adapted to float on the surface of the liquid within the flume, and means depending from the underside of the load carrying element offering resistance to the moving liquid so that the load carrying element is driven by the flowing liquid along the flume, said means on the underside of said load carrying element taking the form of a plurality of pockets secured to the underside of said load carrying element, said pockets being closed at the forward ends thereof and open at the rear ends thereof.

2. The device according to claim 1 in which said pockets are collapsible.

3. A floating conveyor belt system comprising in combination an inclined flume assembly through which a liquid, such as water, runs continuously, an endless flexible load carrying element adapted to float on the surface of the liquid within the flume, and means depending from the underside of the load carrying element offering resistance to the moving liquid so that the load carrying element is driven by the flowing liquid along the flume, said means on the underside of said load carrying element comprising a plurality of rigid paddles hingedly secured by the upper edges thereof to the underside of said load carrying element, and means also secured to the underside of said load carrying element to limit the movement of said paddles.

4. The device according to claim 1 which includes vertical side rollers, secured at intervals along the sides of the flume, said rollers adapted to maintain the load carrying element approximately centrally within the flume.

5. The device according to claim 2 which includes vertical side rollers, secured at intervals along the sides of the flume, said rollers adapted to maintain the load carrying element approximately centrally within the flume.

6. The device according to claim 1 in which the underside run of said endless flexible load carrying element passes back underneath said flume, vertical rollers spaced at intervals along the framework of the underside of the flume adapted to maintain said element centrally, and horizontal rollers journalled for rotation within the framework of the flume upon which said underside run is supported.

7. The device according to claim 2 in which the underside run of said endless flexible load carrying element passes back underneath said flume, vertical rollers spaced at intervals along the framework of the underside of the flume adapted to maintain said element centrally, and horizontal rollers journalled for rotation within the framework of the flume upon which said underside run is supported.

8. The device according to claim 3 in which the underside run of said endless flexible load carrying element passes back underneath said flume, vertical rollers spaced at intervals along the framework of the underside of the flume adapted to maintain said element centrally, and horizontal rollers journalled for rotation within the framework of the flume upon which said underside run is supported.

9. A load carrying element for a floating conveyor system comprising an endless flexible load carrying floor, flexible elongated flotation chambers formed along each side of the floor, and means on the underside of the floor adapted to offer resistance to liquid so that the element can be driven thereby when the element is floating on flowing liquid, said means on the underside of the floor comprising a plurality of pockets secured to the underside of the floor, the pockets being closed at the forward end thereof and open at the rear end thereof.

10. A load carrying element for a floating conveyor system comprising an endles flexible load carrying floor, flexible elongated flotation chambers formed along each side of the floor, and means on the underside of the floor adapted to offer resistance to liquid so that the element can be driven thereby when the element is floating on flowing liquid, said means on the underside of the floor comprising a plurality of rigid paddles hingedly secured by the upper edges thereof to the underside of the floor, and means also secured to the underside of the floor to limit the movement of the paddles.

11. In a floating conveyor system, the combination of an elongated trough having a stream of liquid flowing therethrough, an endless flexible conveyor belt having a buoyant run floating on the liquid in said trough and also having a return run, and projectable and retractable means provided at longitudinally spaced points on said belt, said means being projected and depending from the buoyant run of the belt into the liquid stream for propulsion of the belt by liquid flow through said trough and being retracted to an inoperative position on the return run of the belt.

12. The system as defined in claim 11 wherein said projectable and retractable means comprise pockets of flexible material secured to said belt.

13. The system as defined in claim 11 wherein said projectable and retractable means comprise rigid paddles hingedly connected to said belt for swinging movement from a flat-lying position against the belt to a perpendicular position relative thereto.

14. The system as defined in claim 11 wherein said trough has a liquid discharge end, and a rotatable roller mounted at the discharge end of the trough, said belt passing over said roller and said projectable and retractable means comprising pockets of flexible material secured to said belt, said pockets being collapsible to their retracted position by engagement thereof with said roller.

References Cited in the file of this patent

UNITED STATES PATENTS

| | | |
|---|---|---|
| 515,674 | Guldhang | Feb. 27, 1894 |
| 577,314 | McMurrin | Feb. 16, 1897 |
| 632,750 | Ridgway | Sept. 12, 1899 |
| 699,079 | Coles | Apr. 29, 1902 |
| 1,088,644 | Willson | Feb. 24, 1914 |
| 2,711,076 | Sharp | June 21, 1955 |

FOREIGN PATENTS

| | | |
|---|---|---|
| 115,733 | Austria | Jan. 10, 1930 |
| 10,914 | Great Britain | May 7, 1903 |